(12) United States Patent
Mantin et al.

(10) Patent No.: US 11,463,432 B2
(45) Date of Patent: *Oct. 4, 2022

(54) DATA LEAKAGE PREVENTION OVER APPLICATION PROGRAMMING INTERFACE

(71) Applicant: Imperva, Inc., San Mateo, CA (US)

(72) Inventors: Itsik Mantin, Shoham (IL); Avidan Reich, Tel Aviv (IL)

(73) Assignee: Imperva, Inc., San Mateo, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 17/138,607

(22) Filed: Dec. 30, 2020

(65) Prior Publication Data

US 2021/0306319 A1 Sep. 30, 2021

Related U.S. Application Data

(63) Continuation of application No. 15/929,243, filed on Mar. 24, 2020, now Pat. No. 10,917,401.

(51) Int. Cl.
*H04L 9/40* (2022.01)
*G06F 11/34* (2006.01)
*G06F 9/54* (2006.01)

(52) U.S. Cl.
CPC ............. *H04L 63/083* (2013.01); *G06F 9/54* (2013.01); *G06F 11/3476* (2013.01); *H04L 63/1408* (2013.01); *H04L 63/1425* (2013.01); *H04L 63/1441* (2013.01)

(58) Field of Classification Search
CPC ............... H04L 63/083; H04L 63/1425; H04L 63/1408; H04L 63/1441; G06F 9/54; G06F 11/3476
See application file for complete search history.

(56) References Cited

U.S. PATENT DOCUMENTS

| 5,689,711 A | * | 11/1997 | Bardasz | ............... | G06F 8/34 |
| | | | | | 715/964 |
| 10,057,184 B1 | | 8/2018 | Prahlad et al. | | |
| 2014/0164453 A1 | * | 6/2014 | Chan | ............... | H04L 67/2842 |
| | | | | | 707/827 |

(Continued)

OTHER PUBLICATIONS

Non-Final Office Action, U.S. Appl. No. 15/929,243, dated Jun. 23, 2020, 17 pages.

(Continued)

*Primary Examiner* — Thaddeus J Plecha
(74) *Attorney, Agent, or Firm* — Nicholson, De Vos, Webster & Elliott, LLP

(57) ABSTRACT

A method by a network device for assigning data types to data values included in application programming interface (API) responses sent by an API server to one or more API clients via an API. The method includes obtaining a first set of API responses from an endpoint of the API, generating a profile for the endpoint of the API based on analyzing the first set of API responses, where the profile of the endpoint indicates an expected structure of API responses and expected data types associated with data fields included in API responses, obtaining a second set of API responses, and using the profile of the endpoint of the API to assign data types to data values included in API responses in the second set of API responses.

20 Claims, 5 Drawing Sheets

(56) References Cited

U.S. PATENT DOCUMENTS

| | | | |
|---|---|---|---|
| 2015/0256554 A1 | 9/2015 | Sakakibara et al. | |
| 2016/0283364 A1* | 9/2016 | Raghavan | G06F 11/3688 |
| 2016/0308900 A1 | 10/2016 | Sadika et al. | |
| 2017/0111476 A1 | 4/2017 | Saheba et al. | |
| 2017/0359379 A1 | 12/2017 | Elliot et al. | |
| 2018/0026943 A1* | 1/2018 | Call | G06F 21/629 |
| | | | 726/22 |
| 2018/0077170 A1* | 3/2018 | Glazner | H04L 63/123 |
| 2019/0190890 A1 | 6/2019 | Druker et al. | |
| 2019/0384617 A1 | 12/2019 | Jain et al. | |
| 2020/0213336 A1 | 7/2020 | Yu et al. | |
| 2020/0348986 A1* | 11/2020 | Venkatesh | G06F 8/36 |
| 2021/0294869 A1* | 9/2021 | Gedliczka | G06N 5/047 |

OTHER PUBLICATIONS

Notice of Allowability, U.S. Appl. No. 15/929,243, dated Nov. 5, 2020, 11 pages.

\* cited by examiner

DATA LEAKAGE PREVENTION OVER APPLICATION PROGRAMMING INTERFACE

CROSS-REFERENCE TO RELATED APPLICATIONS

This application is a continuation of Application Ser. No. 15/929,243, filed Mar. 24, 2020 (now U.S. Pat. No. 10,917,401, issued Feb. 9, 2021), which is hereby incorporated by reference.

TECHNICAL FIELD

Embodiments of the invention relate to the field of computer network security, and more specifically to generating audit logs for traffic sent via an application programming interface.

BACKGROUND ART

An application programming interface (API) is an interface or communication protocol between different parts of a computer program intended to simplify the implementation and maintenance of software. An API may be used in web-based systems, operating systems, database systems, computer hardware, and/or software libraries. In the context of web-based systems, the term API is often used to refer to an interface between an API client and an API server. This is a specialized form of API and is sometimes referred to as a web API.

A web API is typically defined as a set of specifications, such as Hypertext Transfer Protocol (HTTP) request messages, along with a definition of the structure of response messages, usually in an Extensible Markup Language (XML) or JavaScript Object Notation (JSON) format. An example is an API provided by a shipping company that can be accessed by an e-Commerce website to automatically determine current shipping rates and to facilitate ordering shipping services from the shipping company.

A web API may publicly expose one or more API endpoints via the web, most commonly by means of an HTTP-based API server. API endpoints are important aspects of interacting with web APIs, as they provide the locations at which API clients can access the web API. API endpoints are often provided in the form of uniform resource locators (URLs).

The number of web APIs that are available has grown and continues to grow, as businesses realize the growth opportunities associated with running an open platform that other software can interact with. Many companies and organizations rely heavily on their web API infrastructure to serve their core business clients. Also, many government organizations collect data and make this data accessible via web APIs.

Organizations often lack visibility into the data flowing to and from their web applications and web APIs. As a consequence, they also lack in security, insights, and policy enforcement with regard to the traffic being sent via their web APIs. This problem is even more acute when these web applications and web APIs are on the organization's perimeter (e.g., the web API is made available to API clients that are outside the organization), creating a risk of data leakage through the perimeter out of the organization.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
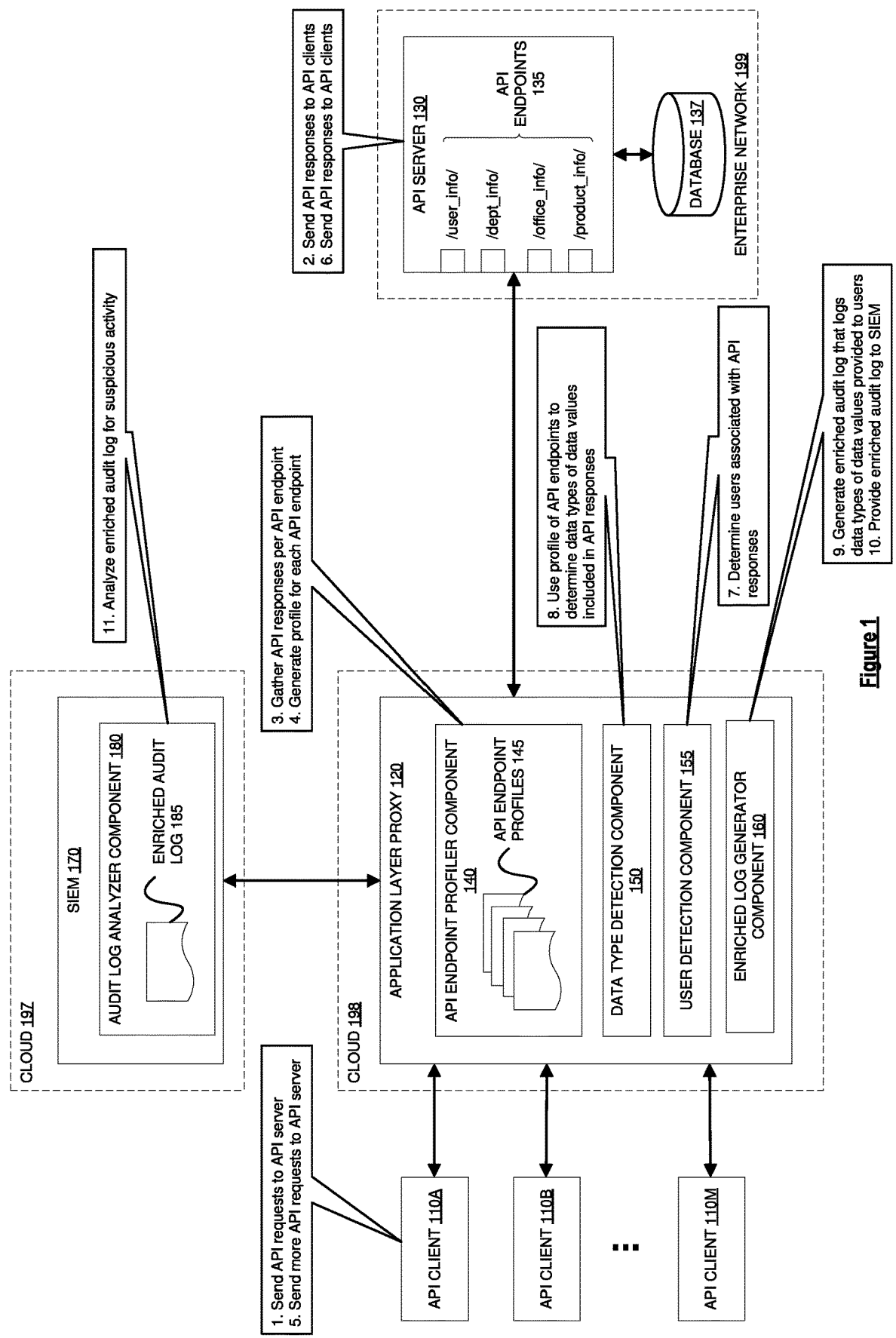
FIG. 1 is a block diagram of a system in which audit logs can be generated for API traffic, according to some embodiments.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, and/or switching), and/or provide support for multiple application services (e.g., data, voice, and video).

As used herein, server end stations are network devices operable to execute or otherwise implement one or more servers providing content or services to clients. For example, server end stations may implement application programming interface (API) servers, web application servers, database servers, file servers, print servers, mail servers, gaming servers, application servers, and/or Domain Name System (DNS) servers.

As used herein, client end stations (e.g., workstations, laptops, netbooks, palm tops, mobile phones, smartphones, multimedia phones, Voice over Internet Protocol (VoIP) phones, user equipment (UE), terminals, portable media players, Global Positioning Satellite (GPS) units, gaming systems, set-top boxes) are network devices operable to execute or otherwise implement applications that, among other functions, can access the content and/or services provided by servers over a network (e.g., over a local area network (LAN), over the Internet, and/or over virtual private networks (VPNs) overlaid on (e.g., tunneled through) the Internet).

An application programming interface (API) server is system software (e.g., running on top of an operating system) executed by server hardware upon which web APIs run. API servers may include a web server (e.g. Apache, Microsoft® Internet Information Server (IIS), nginx, lighttpd), which delivers API responses on the request of API clients (e.g., HyperText Transfer Protocol (HTTP) clients using HTTP), and may also include an application server that executes procedures (e.g., programs, routines, scripts) of a web API.

API clients interact with web APIs by sending API requests (e.g., HTTP request messages) to API servers, which execute portions of web API applications and return data/content (e.g., in a predefined structured format (e.g., Extensible Markup Language (XML) or JavaScript Object Notation (JSON) format)) in the form of API responses (e.g., HTTP response messages) back to the API clients. Thus, web APIs may be provided using a request-response protocol (e.g., HTTP) in a client-server computing model, where the API server typically act as the "server" and the API clients typically act as the "client."

As mentioned above, organizations often lack visibility into the data flowing to and from their web applications and web APIs. As a consequence, they also lack in security, insights, and policy enforcement with regard to the traffic being sent via their web APIs. This problem is even more acute when these web applications and web APIs are on the organization's perimeter (e.g., the web API is made available to entities outside the organization), creating a risk of data leakage through the perimeter out of the organization.

Theoretically, an organization can deploy a data-aware sensor at the perimeter to gain visibility into the data flowing to and from their web applications and web APIs. However, it is difficult to implement a data-aware sensor for traditional web applications since it is difficult to determine/learn the data within the traffic. However, when it comes to web API traffic, determining/learning the data may be possible, since the data within the responses sent via web APIs is usually in a more structured format (e.g., in XML or JSON format). Also, web APIs usually have a machine-readable description, which describes the API traffic (mostly for the API requests but also to some extent the API responses). Throughout this disclosure web APIs may simply be referred to as an API unless the context clearly indicates otherwise.

Embodiments analyze API responses coming from different endpoints of an API to generate a profile for each of the different endpoints of the API. The profile of an endpoint may indicate the expected structure of API responses from the endpoint and the expected data types associated with the data fields included in the API responses from the endpoint. The profile of an endpoint may be used to determine the data types of data values included in subsequent API responses from the endpoint, which information can be logged to generate an enriched audit log. The enriched audit log may provide additional visibility/insight into the traffic sent via the API and thus allow for better detection of undesired, unexpected, and/or suspicious data leakage via the API.

An embodiment is a method by a network device for generating enriched audit logs for API responses sent by an API server to one or more API clients via an API. The method includes obtaining a first set of API responses, where each of the API responses in the first set of API responses were generated by the API server responsive to an API request sent by one of the one or more API clients to an endpoint of the API, generating a profile for the endpoint of the API based on analyzing the API responses in the first set of API responses, where the profile of the endpoint of the API indicates an expected structure of API responses from the endpoint of the API and expected data types associated with data fields included in API responses from the endpoint of the API, obtaining a second set of API responses, where each of the API responses in the second set of API responses were generated by the API server responsive to an API request sent by one of the one or more API clients to the endpoint of the API, using the profile of the endpoint of the API to determine, for each API response in the second set of API responses, data types of data values included in that API response, and generating an enriched audit log for the API responses in the second set of API responses that logs information regarding the data types of the data values included in the second set of API responses. Various embodiments are further described herein with reference to the accompanying figures.

FIG. 1 is a block diagram of a system in which audit logs can be generated for API traffic, according to some embodiments. As shown in the diagram, the system includes API clients 110A-M, API server 130, a database 137 communicatively coupled to the API server 130, an application layer proxy 120 communicatively coupled between the API clients 110A-M and the API server 130, and a security information and event management (SIEM) component 170 communicatively coupled to the application layer proxy 120.

The API clients 110 may access an API implemented by the API server 130, for example, by generating one or more API requests (e.g., in the form of Hypertext Transfer Protocol (HTTP) request messages such as a "POST" HTTP request messages or "GET" HTTP request messages) and sending these API requests to the desired endpoint of the API server 130. For example, an API client 110 may be web browser that uses asynchronous JavaScript and Extensible Markup Language (XML) (AJAX) technology to send API requests to the API server 130 as part of rendering a web page. In the example depicted in the diagram, the API server 130 implements an API for accessing information about a company/business, where the API includes four API endpoints ("/user_info/," "/dept_info/," "/office_info/," and "/product_info/"), where each API endpoint corresponds to a uniform resource locator (URL). For example, the API endpoint "/user_info/" may be an API endpoint for requesting user information, the API endpoint "/dept_info/" may be used for requesting department information, the API endpoint "/office_info/" may be used for requesting office information, and the API endpoint "/product_info/" may be used for requesting product information. The API endpoints 135 provide entry points for API clients 110 to access the API implemented by the API server 130. It should be understood that the "company/business" API is provided as an example to aid in understanding the invention and that the techniques described herein can be applied to APIs that have a different purpose and/or configuration from the example.

In response to receiving API requests to an endpoint of the API, the API server 130 may process the API request and generate corresponding API responses. In one embodiment, processing of the API request involves querying data from the database 137 (e.g., which stores data that is to be returned to API clients 110 via the API). The database 137 may be implemented according to a variety of different database models, such as relational (such as PostgreSQL, MySQL, and certain Oracle® products), non-relational, graph, columnar (also known as extensible record; e.g., HBase), object, tabular, tuple store, and multi-model. The API server 130 may send the corresponding API responses (e.g., in the form of HTTP response messages) containing data/content for the API endpoint to the API clients 110. API responses that are generated and sent in response to an API request sent to an API endpoint may be referred to herein as coming from that API endpoint. The data/content of the API responses may be structured in a predefined format (e.g., XML or JSON format). The API clients 110 may then use the contents of the API responses according to their respective needs. Each of the API clients 110 may be implemented by one or more client end stations and each of the API servers 130 may be implemented by one or more server end stations.

The application layer proxy 120 may be deployed between the API clients 110 and the API server 130 (e.g., on the communication path between the API clients 110 and the API server 130) such that it can see the traffic being sent between the API clients 110 and the API server 130. The application layer proxy 120 may be implemented by one or more network devices. As shown in the diagram, the application layer proxy 120 includes an API endpoint profiler component 140, a data type detection component 150, a user detection component 155, and an enriched log generator component 160, which are further described herein below.

The API endpoint profiler component 140 generates API endpoint profiles 145 for API endpoints 135 based on analyzing API traffic to/from those API endpoints 135. The profile of an API endpoint may indicate the expected structure of API traffic to/from that API endpoint and the expected data types associated with data fields included in API traffic to/from that API endpoint. As mentioned above, the content/data of API traffic is often structured in a predefined format (e.g., XML or JSON format). For example, the content/data of API traffic may be in JSON format, which includes a set of (possibly nested) key-value pairs. In one embodiment, the API endpoint profiler component 140 learns the expected structure of API traffic to/from an API endpoint and the expected data types associated with data fields included in that traffic based on generating key-value paths for the traffic, where each key-value path includes a key path and a value associated with that key path. The API endpoint profiler component 140 may then aggregate the key-value paths based on key path to generate a list of values associated with each key path (e.g., using a GroupBy operation). The data types associated with the data fields corresponding to the key paths can be determined based on the key path itself and/or the values associated with the key path. For example, if the key path itself includes a key named "email_address" and/or the values associated with the key path match the pattern of an email address (e.g., [username]@[domain].com, where [username] and [domain] are any set of characters that are allowed in the username and domain portions of an email address, respectively), then the data field corresponding to the keypath may be determined as being associated with an email address type.

For example, assume the following two API responses (API-response-1 and API-response-2) came from the same API endpoint (for sake of illustration the keys are represented using alphabetic characters and the values are represented using numbers):

API-response-1:
{"A": 1, "B": {"C": 2, "D": 3, "E": {"F": 4, "G": 5, "H": 6}, "I": [7,8,9]}, "J": {"K": 10, "L": 11, "M": 12}, "N": [13, 14, 15, 16]}

API-response-2:
{"A": 17, B: {"C": 18, D: 19, E: {"F": 20, G: 21, H: 22}, I: [23, 24, 25]}, "J": {"K": 26, "O": 27, "P": 28}, "N": [29, 30]}

The key-value paths for API-response-1 can be generated as follows:
A→1
B→C→2
B→D→3
B→E→F→4
B→E→G→5
B→E→H→6
B→I→7
B→I→8
B→I→9
J→K→10
J→L→11
J→M→12
N→13
N→14
N→15
N→16

Similarly, the key-value paths for API-response-2 can be generated as follows:
A→17
B→C→18
B→D→19
B→E→F→20
B→E→G→21
B→E→H→22
B→I→23
B→I→24
B→I→25
J→K→16
J→O→27
J→P→28
N→29
N→30

The key-value paths for the API responses can then be aggregated based on key path as follows:
A: [1, 17]
B→C: [2, 18]
B→D: [3, 19]
B→E→F: [4, 20]
B→E→G: [5, 21]

B→E→H: [6, 22]
B→I: [7, 8, 9, 23, 24, 25]
J→K: [10, 16]
J→L: [11]
J→M: [12]
N: [13, 14, 15, 16, 29, 30]
J→O: [27]
J→P: [28]

The data types associated with the data fields corresponding to one or more of the key paths can then be determined based on the key path itself and/or the values associated with the key path (assuming that the values represented by the numbers were of these classes (e.g., the values represented by numbers 2 and 18 are email addresses, the values represented by numbers 4 and 20 are surnames, etc.)):

A: Name
B→C: Mail Address
B→D: Unknown
B→E→F: Surname
B→E→G: Unknown
B→E→H: Unknown
B→I: Unknown
J→K: Credit Card Number
J→L: Unknown
J→M: Unknown
N: Zip Code
J→O: Unknown
J→P: Unknown A profile of the API endpoint may be generated to indicate the above information or similar information (regarding the structure of API responses from that endpoint and the data types associated with data fields included in API responses from that endpoint). While a particular technique for generating API endpoint profiles 145 has been described, it should be understood that the API endpoint profiler component 140 can generate API endpoint profiles 145 using other techniques. For example, some APIs have a machine-readable description, which describes the API traffic (i.e., an API descriptor such as a Swagger file). The data type detection component 150 may use the machine-readable description (e.g., in addition to or instead of using the technique described above) to generate API endpoint profiles 145. Also, while an example is described where each API endpoint corresponds to a single URL, in some embodiments, an API endpoint may correspond to a collection of URLs. For example, if multiple URLs are deemed to have similar behavior (e.g., similar API requests and/or API responses going to/from those URLs in terms of their structure, data fields, and/or data values), then these URLs can be treated as a single API endpoint for profiling purposes. As a specific example, if similar behavior is seen in the URLs "/a/b/c/john/d/e," "/a/b/c/jane/d/e," and "/a/b/c/steve/d/e," it may be determined that the fourth segment in these URLs is a parameter (a person's name in this example), and thus these URLs may be treated as a single API endpoint for profiling purposes. The API endpoint may be represented as a URL pattern such as "/a/b/c/*/d/e," where "*" represents a wild card.

The data type detection component 150 detects/determines the data types of data values included in API traffic. The data type detection component 150 may determine the data types of data values included in API traffic to/from an API endpoint using the profile generated for that API endpoint. For example, continuing with the example provided above, the data type detection component 150 may determine that data values included in the data field corresponding to key path "B→C" are mail addresses, the data values included in the data field corresponding to key path "B→E→F" are surnames, data values included in the data field corresponding to key path "J→K" are credit card numbers, and so on.

The user detection component 155 detects/determines the users associated with API traffic. In one embodiment, the user detection component 155 determines the users associated with API traffic to/from an endpoint based on an authentication token included in API requests to the endpoint. For example, the API server may provide an authentication token such as a session cookie to the API client during an initial user login process, which the API clients are to include in its API requests. The user detection component 155 may generate/maintain a mapping of usernames to authentication tokens based on observing the message exchange during the login process (the mapping can be stored at the application layer proxy 120 or elsewhere (e.g., at the API server 130)). The user detection component 155 may then user the mapping to determine the users associated with API responses (e.g., by extracting authentication tokens from the API requests corresponding to the API responses and looking up the users associated with the authentication tokens using the mapping). While a particular technique for detecting/determining the users associated with API traffic has been described, it should be understood that the user detection component 155 can detect/determine the users associated with API traffic using other techniques.

The enriched log generator component 160 generates enriched audit logs for API traffic. The enriched logs may log information regarding the data types of the data values included in the API traffic (e.g., as determined by the data type detection component 150). In some embodiments, the enriched audit logs also log information regarding the users associated with the API traffic (e.g., as determined by the user detection component 155). In one embodiment the enriched audit logs log, for each API response, at least a timestamp for that API response, information regarding the user associated with that API response, and the number of data values having a given data type included in that API response. In one embodiment, the enriched audit logs log the actual data values included in the API response (e.g., if those data values are not considered sensitive) and/or masked versions of the data values included in the API responses (e.g., if those data values are considered sensitive (e.g., passwords, social security number, and/or other personal/sensitive information)). The enriched audit logs are enriched in the sense that they include additional information (e.g., information regarding the data types of the data values included in the API traffic and/or the users associated with the API traffic) that is typically not included in standard audit logs. The enriched log generator component 160 may provide the enriched audit logs (e.g., enriched audit log 185) to the SIEM component 170 or similar component to be analyzed/used (e.g., to display the enrichment information to security personnel, to perform anomaly detection, and/or to enforce security policies). In one embodiment, the enriched audit logs 180 are stored (in long-term storage) at the application layer proxy 120 as done with traditional logging mechanisms. In other embodiments, the enriched audit logs 180 are provided to other components (e.g., the SIEM component 170) for further analysis/use without being stored at the web application layer proxy 120.

The SIEM component 170 provides security information management and security event management functionalities. As shown in the diagram, the SIEM component 170 includes an audit log analyzer component 180. The audit log analyzer component 180 may analyze the enriched audit log 185 provided by the application layer proxy 120 for anomalous/suspicious activity. For example, the audit log analyzer component 180 may analyze the enriched audit log to determine when a certain user is provided more than 20 social security numbers within a predefined period of time (e.g., within an hour), and in response cause that user to be blocked from further accessing the API. Such analysis/action is possible because the enriched audit log 185 is enriched with information regarding the data types of the data values included in the API traffic and the users associated with the API traffic.

Exemplary operations for generating enriched audit logs for API traffic will now be described with reference to FIG. 1 to further illustrate embodiments of the invention. At operation '1', the API clients 110 send API requests to the API server 130 (to the endpoints 135 of the API implemented by the API server 130). At operation '2' the API server 130 processes the API requests (e.g., which may involve querying the database 137) and sends corresponding API responses to the API clients 110. At operation '3', the application layer proxy 120 intercepts and gathers API responses per API endpoint. At operation '4', the API endpoint profiler component 140 generates a profile for each API endpoint (API endpoint profiles 145) based on analyzing the API responses from that endpoint (e.g., using the techniques described above).

At operation '5', the API clients 110 subsequently send additional API requests to the API server 130 (to the endpoints of the API implemented by the API server 130). At operation '6', the API server 130 processes the API requests (e.g., which may involve querying the database 137) and sends corresponding API responses to the API clients 110. At operation '7', the application layer proxy 120 intercepts the API responses and the user detection component 160 determines the users associated with the API responses. Also, at operation '8', the data type detection component 150 uses the previously generated API endpoint profiles 145 to determine the data types of data values included in the API responses. At operation '9', the enriched log generator component 160 generates an enriched audit log 185 that logs the data types of data values provided to users. At operation '10', the enriched log generator component 160 provides the enriched audit log to the SIEM component 170. At operation '11', the audit log analyzer component 180 of the SIEM component 170 analyzes the enriched audit log for suspicious activity.

A technical benefit of embodiments described herein is that they enrich audit logs with data type information (and user information in some embodiments), which provides better visibility/insight into the traffic being sent via an API. Another benefit of embodiments described herein is that they can be implemented using a single sensor (e.g., implemented at the application layer proxy) thereby simplifying deployment and maintenance. This is in contrast to conventional techniques that typically require manual effort and/or deploying multiple sensors at multiple different locations to determine such level of information.

While the diagram shows the system as including a single application layer proxy 120, in some embodiments the system may include multiple application layer proxies 120 (e.g., that are geographically dispersed), which are communicatively coupled between the API clients 110 and the API servers 130 to generate enriched audit logs 185. Also, while the diagram shows an inline deployment (the application layer proxy 120 sits inline to the traffic between the API clients 110 and the API servers 130), it should be understood that the techniques described herein can also be implemented in non-inline deployments (e.g., a system that includes a security device that sniffs or otherwise obtains API traffic being sent between the API clients 110 and the API servers 130, which generates enriched audit logs 185). Also, while the diagram shows an embodiment in which the application layer proxy 120 generates enriched audit logs 185, it should be understood that the invention is not so limited. For example, in other embodiments, the audit log enrichment operations described herein being performed by the application layer proxy 120 can instead be implemented by a runtime agent protecting the API server 130 (e.g., using runtime application self-protection (RASP) technology—RASP is a security technology that uses runtime instrumentation to detect and block attacks by taking advantage of information from inside the running software). More generally, the audit log enrichment operations described herein can be implemented by any network/computing device that is able to obtain/see the API traffic (e.g., API request and/or API responses sent via an API) or a record thereof.

One or more components of the system may be deployed in a cloud (e.g., a cloud provided by a cloud provider such as Amazon®, Microsoft®, etc.) and/or on premise (e.g., in an enterprise network). In an exemplary arrangement, the application layer proxy 120 is deployed in a cloud 198 while the API server 130 is deployed on-premise (in an enterprise network 199), and any API requests originated by the API clients 110 that are intended for the API server 130 are first directed to the application layer proxy 120 in the cloud 198 (e.g., by changing Domain Name Service (DNS) records) before being sent to the on-premise API server 130. It should be understood that other arrangements are also possible. For example, both the application layer proxy 120 and the API server 130 may be deployed in the cloud or both may be deployed on-premise. In one embodiment, the SIEM component 170 is deployed in a cloud 197 (which may be the same or different cloud than the cloud 198 in which the application layer proxy 120 is deployed).

Figure 2:
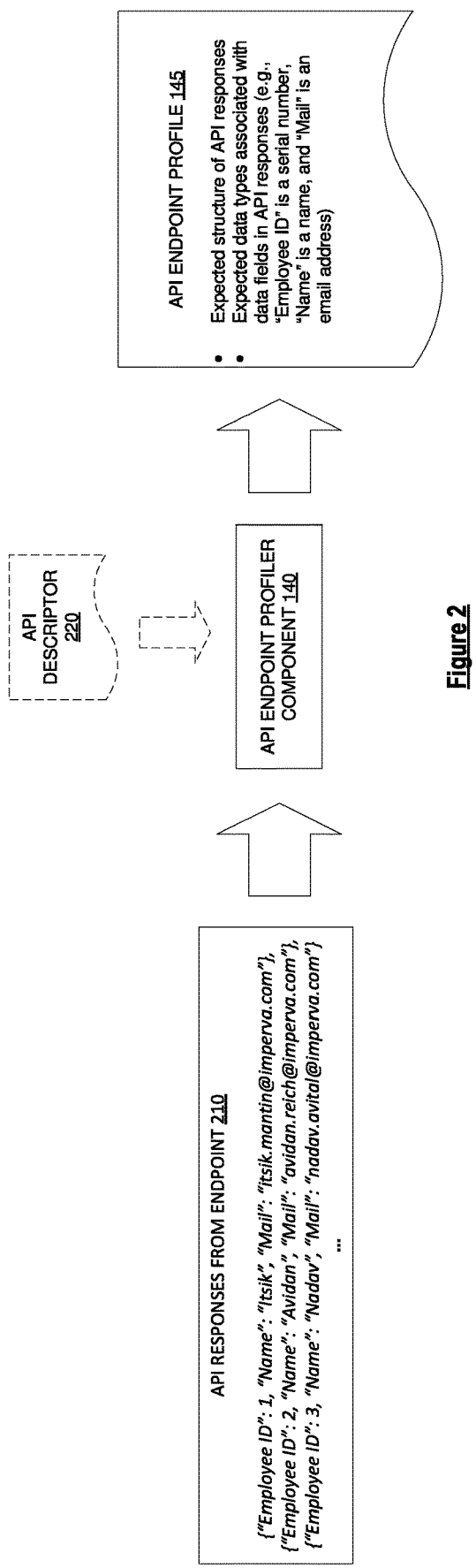
FIG. 2 is a diagram illustrating the inputs and outputs of the API endpoint profiler component, according to some embodiments.

FIG. 2 is a diagram illustrating the inputs and outputs of the API endpoint profiler component, according to some embodiments. As shown in the diagram, the API endpoint profiler component 140 receives as input API responses 210 from an API endpoint. For example, as shown in the diagram, the API responses 210 include at least three API responses, including "{'Employee ID': 1, "Name": 'Itsik', 'Mail': 'itsik.mantin@imperva.com'}," "{'Employee ID': 2, 'Name': 'Avidan', 'Mail': 'avidan.reich@imperva.com'}," and "{'Employee ID': 3, 'Name': 'Nadav', 'Mail': 'nadav.avital@imperva.com'}." In one embodiment, the API endpoint profiler component 140 also receives as input an API descriptor 220. In one embodiment, the API descriptor 220 is a Swagger file. The API endpoint profiler component 140 generates as output an API endpoint profile 145. The API endpoint profile 145 indicates the expected structure of the API responses from the endpoint and the expected data types associated with the data fields in the API responses from the endpoint. For example, the API endpoint profile 145 may indicate that the expected structure of the API responses from the endpoint is three key-value pairs with keys "Employee ID", "Name", and "Mail". Also, the API profile may indicate that the expected data type associated with the "Employee ID" data field is a serial number type, the expected data type associated with the "Name" data field is a name type, and the expected data type associated with the "Mail" data field is an email address type.

Figure 3:
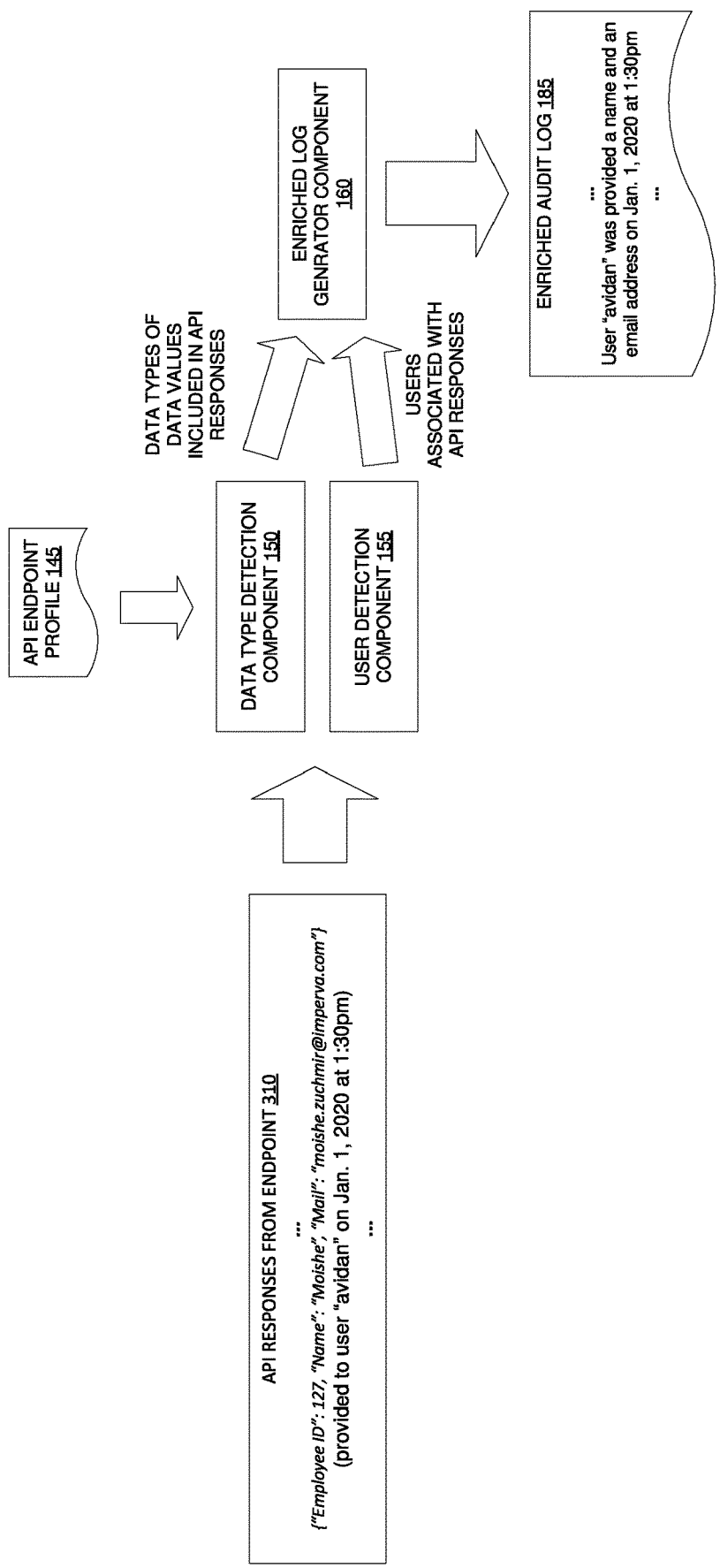
FIG. 3 is a diagram illustrating the inputs and outputs of the data type detection component, the user detection component, and the enriched log generator component according to some embodiments.

FIG. 3 is a diagram illustrating the inputs and outputs of the data type detection component, the user detection component, and the enriched log generator component according to some embodiments. As shown in the diagram, the user detection component 155 and the data type detection component 150 receive as input API responses 310 coming from an API endpoint. For example, as shown in the diagram, the API responses 310 include an API response "{'Employee ID': 127, 'Name': 'Moishe', 'Mail': 'moishe.zuchmir@imperva.com'}," which is provided to user having username "avidan" on Jan. 1, 2020 at 1:30 pm. The data type detection component 150 may also receive as input the API endpoint profile 145. The data type detection component 150 generates as output the data types of data values included in the API responses 310 (e.g., which are determined using the API endpoint profile 145). The user detection component 155 generates as output the users associated with the API responses (e.g., based on inspecting authentication tokens in API requests corresponding to the API responses 310). The enriched log generator component 160 receives as input the data types of data values included in the API responses (generated by the data type detection component 150) and the users associated with the API responses (generated by the user detection component 155). The enriched log generator component 160 generates as output an enriched audit log 185, which includes information regarding the data types of the data values included in the API responses and the users associated with the API responses. For example, the enriched audit log 185 may include a log entry indicating that a user having username "avidan" was provided a name and an email address on Jan. 1, 2020 at 1:30 pm.

Figure 4:
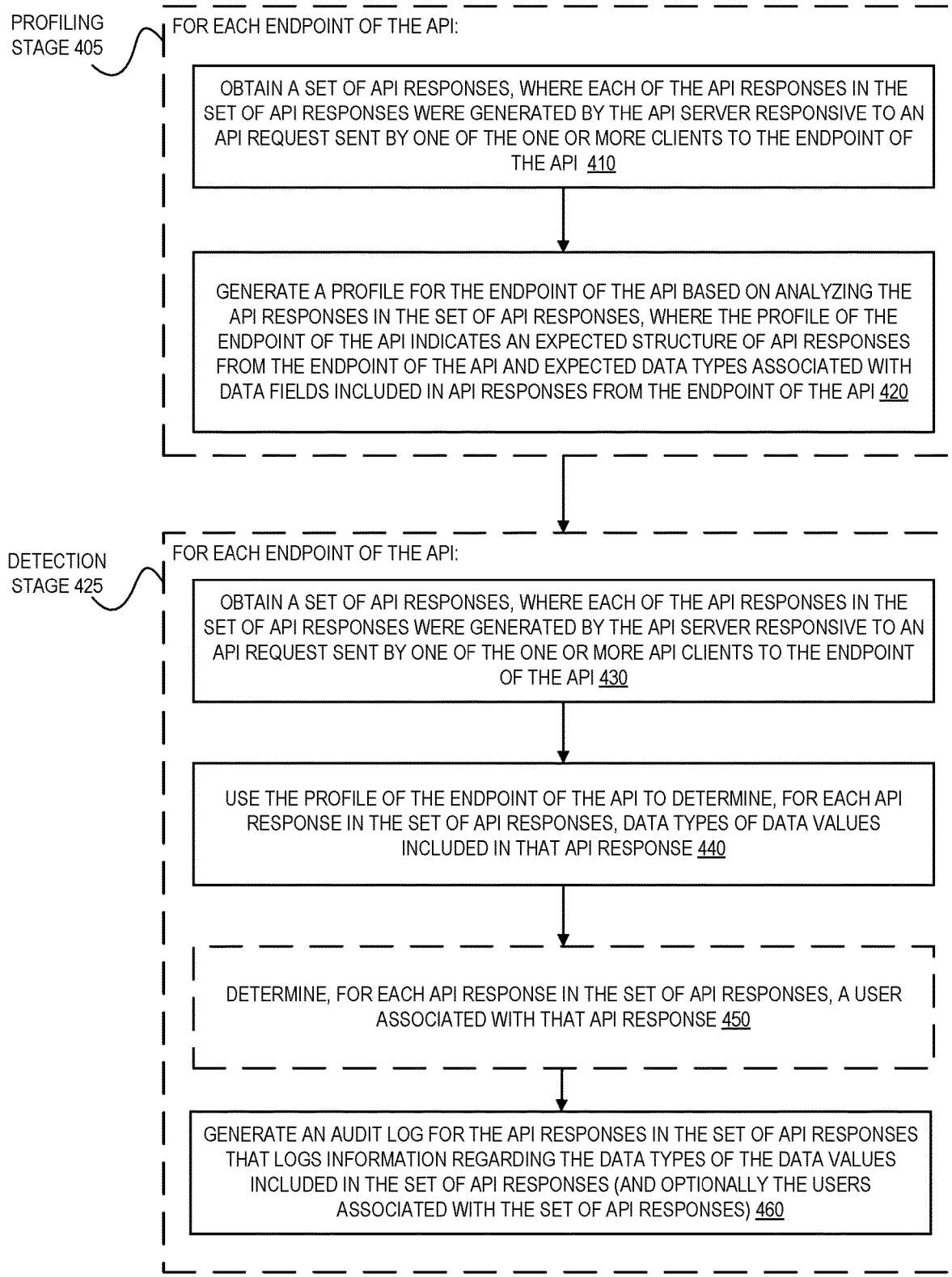
FIG. 4 is a flow diagram of a process for generating audit logs for API traffic, according to some embodiments.

FIG. 4 is a flow diagram of a process for generating audit logs for API traffic, according to some embodiments. In one embodiment, the process is implemented by a network device. In one embodiment, the network device implements an application layer proxy 120 that is communicatively coupled between one or more API clients 110 and an API server 130. In another embodiment, the network device implements an API server 130 and the process is implemented by a runtime agent implemented by the network device that protects the API server 130 (e.g., using RASP technology). In one embodiment, the API server 130 is located inside an enterprise network and the one or more API clients 110 are located outside of the enterprise network. The process may be implemented using hardware, software, firmware, or any combination thereof.

The operations in the flow diagram are described with reference to the exemplary embodiments of the other diagrams. However, it should be understood that the operations of the flow diagram can be performed by embodiments other than those discussed with reference to these other diagrams, and the embodiments discussed with reference to these other diagrams can perform operations different than those discussed with reference to the flow diagram. Also, while the flow diagram shows a particular order of operations performed by certain embodiments, it should be understood that such order is exemplary (e.g., alternative embodiments may perform the operations in a different order, combine certain operations, overlap certain operations, etc.).

The process can be divided into a profiling stage 405 and a detection stage 425.

In the profiling stage 405, the operations of blocks 410 and 420 are performed for each of one or more endpoints of the API. At block 410, the network device obtains a set of API responses, where each of the API responses were generated by the API server responsive to an API request sent by one of the one or more API clients to the endpoint of the API. In one embodiment, the endpoint of the API corresponds to a URL that is used to access a function of the API. At block 420, the network device generates a profile for the endpoint of the API based on analyzing the API responses in the set of API responses, where the profile of the endpoint of the API indicates an expected structure of API responses from the endpoint of the API and expected data types associated with data fields included in API responses from the endpoint of the API. In one embodiment, the profile of the endpoint of the API is generated based on an API descriptor of the API (e.g., a Swagger file).

In the detection stage 425, the operations of blocks 430-460 are performed for each of the one or more endpoints of the API. At block 430, the network device obtains a set of API responses, where each of the API responses in the set of API responses were generated by the API server responsive to an API request sent by one of the one or more API clients to the endpoint of the API. At block 440, the network device uses the profile of the endpoint of the API to determine, for each API response in the set of API responses, data types of data values included in that API response. In one embodiment, at block 450, the network device determines, for each API response in the set of API responses, a user associated with that API response. In one embodiment, the user associated with an API response is determined based on an authentication token (e.g., session cookie) included in an API request corresponding to that API response. At block 460, the network device generates an audit log for the API responses in the set of API responses that logs information regarding the data types of the data values included in the set of API responses (and optionally information regarding the users associated with the API responses (e.g., if the operation of block 450 are performed to determine the users associated with API responses)). The audit log may be considered to be "enriched" in the sense that it includes additional information typically not included in typical/standard audit logs such as the data type information and/or user information. In one embodiment, the audit log for the API responses in the set of API responses logs, for each API response, a timestamp for that API response, information regarding the user associated with that API response, and the number of data values having a given data type included in that API response. In one embodiment, the audit log for the API responses in the set of API responses logs actual data values and/or masked versions of the data values included in the API responses in the set of API responses. In one embodiment, the network device provides the audit log to a SIEM component or similar component for analysis/use (e.g., to display the audit log information to security personnel, to perform anomaly detection, and/or to enforce security policies).

In one embodiment, the network device causes a user to be blocked from accessing the API in response to a determination, based on analyzing the audit log for the API responses in the set of API responses, that the user has been provided more than a threshold number of data values of a data type that is considered to be sensitive (e.g., password, social security number, etc.) within a predefined period of time. The network device may cause other security measures to be performed based on the information regarding the data types of the data values included in the set of API responses and/or the users associated with the set of API responses.

Figure 5:
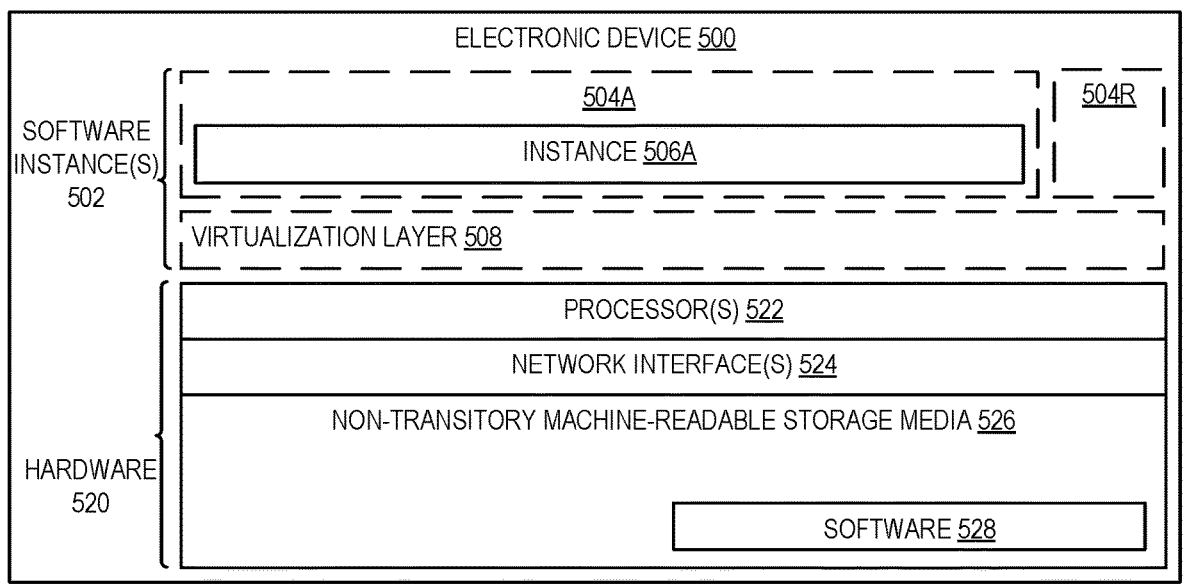
FIG. 5 is a block diagram illustrating an electronic device, according to some embodiments.

FIG. 5 is a block diagram illustrating an electronic device, according to some embodiments. FIG. 5 illustrates hardware 520 comprising a set of one or more processor(s) 522, a set of one or more network interfaces 524 (wireless and/or wired), and non-transitory machine-readable storage medium/media 526 having stored therein software 528

(which includes instructions executable by the set of one or more processor(s) 522). Software 528 can include code, which when executed by hardware 520, causes the electronic device 500 to perform operations of one or more embodiments described herein (e.g., operations for generating enriched audit logs). Thus, the application layer proxy 120, the API server 130, and/or the SIEM component 170 may each be implemented by one or more electronic devices.

In electronic devices that use compute virtualization, the set of one or more processor(s) 522 typically execute software to instantiate a virtualization layer 508 and software container(s) 504A-R (e.g., with operating system-level virtualization, the virtualization layer 508 represents the kernel of an operating system (or a shim executing on a base operating system) that allows for the creation of multiple software containers 504A-R (representing separate user space instances and also called virtualization engines, virtual private servers, or jails) that may each be used to execute a set of one or more applications; with full virtualization, the virtualization layer 508 represents a hypervisor (sometimes referred to as a virtual machine monitor (VMM)) or a hypervisor executing on top of a host operating system, and the software containers 504A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 528 (illustrated as instance 506A) is executed within the software container 504A on the virtualization layer 508. In electronic devices where compute virtualization is not used, the instance 506A on top of a host operating system is executed on the "bare metal" electronic device 500. The instantiation of the instance 506A, as well as the virtualization layer 508 and software containers 504A-R if implemented, are collectively referred to as software instance(s) 502.

Alternative implementations of an electronic device may have numerous variations from that described above. For example, customized hardware and/or accelerators might also be used in an electronic device.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory machine-readable storage media (e.g., magnetic disks, optical disks, random access memory (RAM), read-only memory (ROM); flash memory, phase-change memory) and transitory computer-readable communication media (e.g., electrical, optical, acoustical or other form of propagated signals, such as carrier waves, infrared signals, digital signals). In addition, electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses, bridges). Thus, the non-transitory machine-readable storage media of a given electronic device typically stores code (i.e., instructions) for execution on the set of one or more processors of that electronic device. Of course, various parts of the various embodiments presented herein can be implemented using different combinations of software, firmware, and/or hardware. As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method by one or more network devices for assigning data types to data values included in application programming interface (API) responses sent by an API server to one or more API clients via an API, comprising:
    obtaining a first set of API responses, wherein each of the API responses in the first set of API responses were generated by the API server responsive to an API request sent by one of the one or more API clients to an endpoint of the API;
    generating a profile for the endpoint of the API based on analyzing the API responses in the first set of API responses, wherein the profile of the endpoint of the API indicates an expected structure of API responses from the endpoint of the API and expected data types associated with data fields included in API responses from the endpoint of the API;
    obtaining a second set of API responses, wherein each of the API responses in the second set of API responses were generated by the API server responsive to an API request sent by one of the one or more API clients to the endpoint of the API; and
    for each API response in the second set of API responses, using the profile of the endpoint of the API to assign data types to data values included in that API response.

2. The method of claim 1, further comprising:
    providing information regarding the data types assigned to the data values included in the second set of API responses to a component that is to use the information.

3. The method of claim 2, wherein the component is to use the information by displaying the information to security personnel, performing anomaly detection based on the information, or enforcing security policies based on the information.

4. The method of claim 2, wherein the information is provided to the component without being stored in long-term storage of the one or more network devices.

5. The method of claim 1, wherein the API responses in the first set of API responses and the second set of API responses are responses to asynchronous JavaScript and Extensible Markup Language (AJAX) API requests.

6. The method of claim 1, wherein the endpoint of the API corresponds to a collection of uniform resource locators (URLs) conforming to a URL pattern.

7. The method of claim 1, wherein the one or more network devices implement a web application layer proxy.

8. The method of claim 1, further comprising:
determining, for each API response in the second set of API responses, a user associated with that API response.

9. The method of claim 8, wherein the user associated with an API response in the second set of API responses is determined based on an authentication token included in an API request corresponding to that API response.

10. The method of claim 8, further comprising:
providing information regarding the data types assigned to the data values included in the second set of API responses and information regarding users associated with API responses in the second set of API responses to a component that is to use the information regarding the data types assigned to the data values included in the second set of API responses and the information regarding users associated with API responses in the second set of API responses.

11. A set of one or more non-transitory machine-readable storage media storing instructions which, when executed by one or more processors of one or more network devices, causes the one or more network devices to perform operations for assigning data types to data values included in application programming interface (API) responses sent by an API server to one or more API clients via an API, the operations comprising:
obtaining a first set of API responses, wherein each of the API responses in the first set of API responses were generated by the API server responsive to an API request sent by one of the one or more API clients to an endpoint of the API;
generating a profile for the endpoint of the API based on analyzing the API responses in the first set of API responses, wherein the profile of the endpoint of the API indicates an expected structure of API responses from the endpoint of the API and expected data types associated with data fields included in API responses from the endpoint of the API;
obtaining a second set of API responses, wherein each of the API responses in the second set of API responses were generated by the API server responsive to an API request sent by one of the one or more API clients to the endpoint of the API; and
for each API response in the second set of API responses, using the profile of the endpoint of the API to assign data types to data values included in that API response.

12. The set of one or more non-transitory machine-readable storage media of claim 11, wherein the operations further comprise:
providing information regarding the data types assigned to the data values included in the second set of API responses to a component that is to use the information.

13. The set of one or more non-transitory machine-readable storage media of claim 12, wherein the component is to use the information by displaying the information to security personnel, performing anomaly detection based on the information, or enforcing security policies based on the information.

14. The set of one or more non-transitory machine-readable storage media of claim 12, wherein the information is provided to the component without being stored in long-term storage of the one or more network devices.

15. The set of one or more non-transitory machine-readable storage media of claim 11, wherein the API responses in the first set of API responses and the second set of API responses are responses to asynchronous JavaScript and Extensible Markup Language (AJAX) API requests.

16. The set of one or more non-transitory machine-readable storage media of claim 11, wherein the endpoint of the API corresponds to a collection of uniform resource locators (URLs) conforming to a URL pattern.

17. The set of one or more non-transitory machine-readable storage media of claim 11, wherein the one or more network devices implement a web application layer proxy.

18. The set of one or more non-transitory machine-readable storage media of claim 11, wherein the operations further comprise:
determining, for each API response in the second set of API responses, a user associated with that API response.

19. The set of one or more non-transitory machine-readable storage media of claim 18, wherein the user associated with an API response in the second set of API responses is determined based on an authentication token included in an API request corresponding to that API response.

20. The set of one or more non-transitory machine-readable storage media of claim 18, wherein the operations further comprise:
providing information regarding the data types assigned to the data values included in the second set of API responses and information regarding users associated with API responses in the second set of API responses to a component that is to use the information regarding the data types assigned to the data values included in the second set of API responses and the information regarding users associated with API responses in the second set of API responses.

\* \* \* \* \*